United States Patent [19]
Kronberg

[11] Patent Number: 5,388,446
[45] Date of Patent: Feb. 14, 1995

[54] METHOD AND APPARATUS FOR CONTAINER LEAKAGE TESTING

[75] Inventor: James W. Kronberg, Aiken, S.C.

[73] Assignee: The United States of America as represented by the United States Department of Energy, Washington, D.C.

[21] Appl. No.: 136,830

[22] Filed: Oct. 18, 1993

[51] Int. Cl.$^6$ ............................................. G01M 3/20
[52] U.S. Cl. ...................................... 73/40.7; 73/45.1
[58] Field of Search ................. 73/40.7, 41, 45, 45.1, 73/45.4

[56] References Cited

U.S. PATENT DOCUMENTS

| | | | |
|---|---|---|---|
| 3,757,587 | 9/1973 | Ahnsorge | 73/45.4 |
| 3,762,212 | 10/1973 | Morley et al. | 73/40.7 |
| 3,847,013 | 11/1974 | Luy | 73/40.7 |
| 3,857,278 | 12/1974 | Jenkins et al. | 73/40.7 |
| 4,184,362 | 1/1980 | Standley et al. | 73/45.1 X |

FOREIGN PATENT DOCUMENTS

| | | | |
|---|---|---|---|
| 2344008 | 10/1977 | France | 73/40.7 |
| 130086 | 11/1978 | Japan | 73/40.7 |
| 59191 | 5/1979 | Japan | 73/40.7 |
| 227524 | 2/1969 | U.S.S.R. | 73/40 |

*Primary Examiner*—Thomas P. Noland
*Assistant Examiner*—Joseph W. Roskos
*Attorney, Agent, or Firm*—Brian R. Tumm; Harold M. Dixon; William R. Moser

[57] ABSTRACT

An apparatus for use in one-hundred percent leak testing of food containers used in conjunction with a tracer gas. The apparatus includes a shell with entrance and exit air locks to create a controlled atmosphere through which a series of containers is conveyed by a conveyor belt. The pressure in the shell is kept lower than the pressure in the containers and the atmosphere is made to flow with the containers so that a tracer gas placed in the packages before sealing them will leak more readily, but the leaked tracer gas will remain associated with the leaking package as it moves through the shell. The leaks are detected with a sniffer probe in fluid communication with a gas chromatograph. The gas chromatograph issues a signal when it detects a leak to an ejector that will eject the leaking container from the conveyor. The system is timed so that the series of containers can move continuously into and out of the shell, past the probe and the ejector, without stopping, yet each package is tested for leaks and removed if leaking.

19 Claims, 1 Drawing Sheet

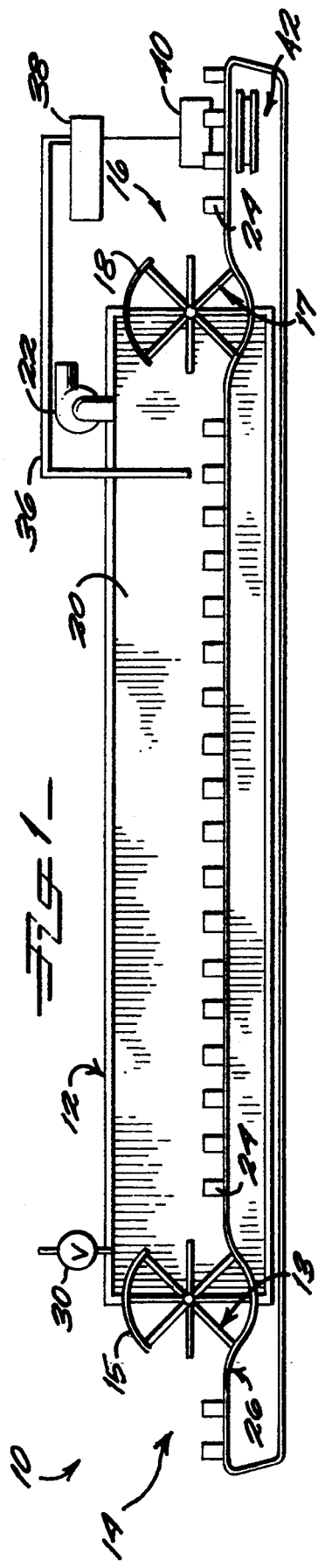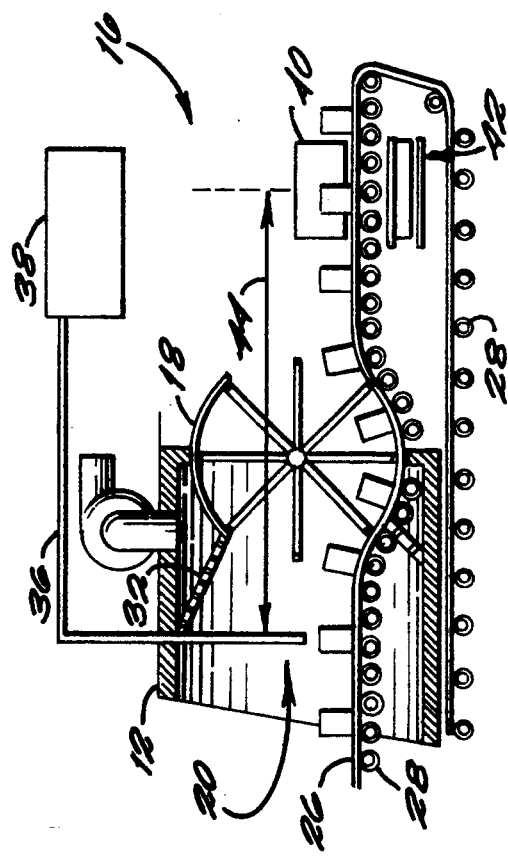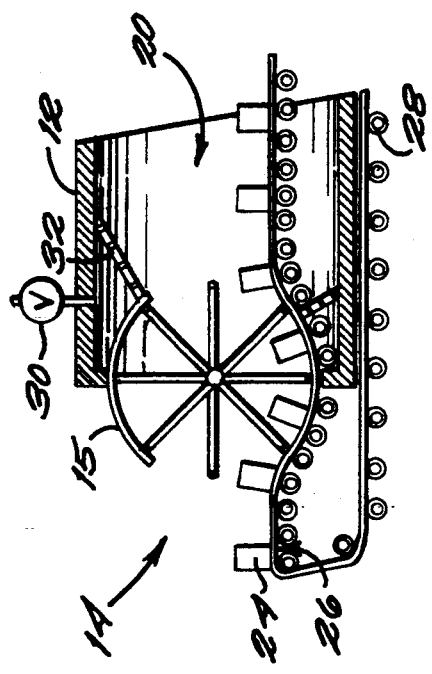

METHOD AND APPARATUS FOR CONTAINER LEAKAGE TESTING

BACKGROUND OF THE INVENTION

1. Field of the Invention

The present invention relates to an apparatus for use in detecting leaks in food packages. In particular, the present invention relates to an apparatus that allows nondestructive leak testing of food packages using trace levels of non-toxic perfluorinated gas as a tracer compound and a detection means employing a region of reduced pressure and laminar air flow wherein a leak may be detected. The United States Government has rights in this invention pursuant to Contract No. DE-AC09-89SRI8035 between the U.S. Department of Energy and Westinghouse Savannah River Company.

2. Discussion of Background

Food processors are required by law to assess the integrity of the packages they distribute. Consequently, millions of dollars are spent annually in order to ensure food product safety. Leak tests are necessary to ensure that microbial contamination has not occurred after sealing. Of the greatest concern is the detection of leaks between 25 and 100 microns, or "microleaks." Due to their small size, microleaks are the most difficult to detect and therefore random sampling is required. Given the state of the art, random sampling involves removing the sample from the assembly line and subsequently performing destructive tests that render the product unfit for sale. This destructive testing is inefficient and costly. Furthermore, the results of these tests are statistically limited by the size of the sample.

Current gas leak detection tests for industrial processing involve the injection of a pressurized tracer gas into a hollow section of a container followed by monitoring of the area surrounding the container for the presence of tracer gas. For example, helium leak testing is widely used for industrial applications and has been applied to food packaging on a limited basis. Being nontoxic, odorless and tasteless, helium can be introduced into sample glasses or metal containers and if leaks exist, such leaks can be detected by external detection devices. Gas leak detection is virtually the only method by which a container may remain intact after testing.

Current tracer gas detection is typically carried out using a "sniffer wand", i.e. a long hollow tube attached to an air pump and detector. The wand is passed over the surface of a large container or pipe, or through an array of smaller ones, in order to find the highest concentration of tracer gas. For example, the refrigeration industry has long used a "torch sniffer" to determine the existence and location of Freon TM and other chlorine based gas leaks. In this application, a sniffer wand is attached through a flexible hose to the air intake of a blowtorch whose flame contacts a copper plate or mesh. Refrigerant gas passes through the wand and hose assembly and decomposes in the flame. The elemental chlorine reacts with the copper to form a volatile copper chloride which gives the flame a distinctive bluish—green glow. The appearance of this glow thus signals a leak, which can be located by moving the wand until the glow is brightest. Freon TM, while nontoxic, odorless, tasteless, and stable under most conditions, is not suitable for widespread use in testing food product containers for leaks because its solar radiation induced decomposition in the upper atmosphere poses a danger to the protective ozone layer which blocks this radiation from the Earth's surface.

Unlike chlorine bearing gases, which can be detected in the presence of copper and heat, other gases require more complex detection methods. With helium leak detection, a mass spectrometer must first sample the air, ionize it, and then pass the ions through crossed electric and magnetic fields, thereby detecting helium by its high charge to mass ratio. Another common tracer gas, Sulfur Hexafluoride (SF6), is detected by irradiating the air with low energy beta-particles (electrons) from a metal foil doped with tritium and detecting the resulting current. Since SF6's outer shell is composed of fluorine, the most electronegative element known, the SF6 readily absorbs and holds these electrons, thereby altering the current in the metal foil. This permits the detection of SF6 in air at extremely low concentrations, well below one part per trillion.

While the detection methods used in tandem with helium and SF6 tracer gases are highly sensitive, they are slow to respond. The mass spectrometer utilized in helium testing requires several seconds to process a sample while a typical gas chromatograph requires more than a minute to identify the presence of SF6. This makes any type of sniffer-wand application very time and labor intensive. The problem is compounded when a large number of relatively small, individual containers must be tested for leaks, since a great many separate measurements will be needed to identify which one or few among them is actually leaking. The slow response time of the present methods and the high rates at which food packages are produced and distributed, makes one hundred percent leak testing impossible.

A further problem with gas detection methods arises when the pressure within the container to be tested is equal to or less than that of the external environment; a common occurrence with containers sealed at high temperatures when they are tested after cooling. Under these conditions, no net outward flow of gas from the container will occur even at a leak, and the only escape of tracer gas will be through diffusion. As a result, the identification of leaks is almost impossible. Net outward gas flow can be re-established by placing the container in a vacuum chamber wherein the external pressure is less than the pressure inside the container. However this procedure increases both the cost and time required to detect leaks.

Therefore there exists a present need for testing for leaks in food packages nondestructively and efficiently so that one hundred percent leak detection is possible and cost-effective.

SUMMARY OF THE INVENTION

According to its major aspects and broadly stated, the present invention is an apparatus for use in nondestructive, one-hundred percent food package leak detection using trace levels of a non-toxic perfluorinated tracer gas introduced into food containers. The apparatus comprises an enclosed shell with gates located at both the entrance and exit of the shell, a conveyor belt which transports the containers through the enclosed shell, such shell having a reduced pressure and laminar air flow environment to draw the tracer gas out through any existing leaks and subsequently retain such gas in the immediate vicinity of the leaking container so that the leak can be associated with the container, means to draw off and analyze air present in the shell and means to automatically remove or eject a leaking container from the normal assembly line process.

Preferably, containers enter and exit the reduced pressure, enclosed shell by means of rotating airlocks that are in communication with a conveyor belt that continuously transports the containers through the shell. See patent application Ser. No. 08/100,161 filed Aug. 2, 1993 entitled "Conveyer With Rotary Airlock Apparatus" which is hereby incorporated by reference. Alternatively, entry and exit may be made through conventional, sequentially cycling gates, whereby containers are transferred from one conveyor into the enclosed shell and upon exiting the enclosed shell, are transferred to a second conveyor belt.

Concurrent regulation of both a valving means and a blower create a reduced pressure, laminar air flow atmosphere within the enclosed shell wherein any tracer gas emitted by a container will remain in the vicinity of that container as it traverses the enclosed shell. While inside the enclosed shell, the containers are tested for leaks by means of a "sniffer probe" in coordination with a high speed multicolumn gas chromatograph. The removal means, located outside the enclosed shell, are actuated by a signal transmitted by the gas chromatograph when a predetermined concentration of tracer gas is detected. Such removal means automatically remove the leaking container from the conveyer belt and divert it elsewhere.

A major feature of the present invention is the operational cooperation between the rotating gates, the sniffer probe, the gas chromatograph, the ejection means and the conveyor belt which permits the containers to be tested while moving on the conveyor belt. Furthermore, since such on-line testing is done in conjunction with an odorless, colorless, tasteless, non-toxic, yet easily detected tracer gas, preferably SF6, the testing can be done nondestructively, leaving the tracer gas in the container if it does not leak. Doing the testing on-line and nondestructively means that it can be done on all the containers without reducing the productivity of the operation. This feature provides a more effective, less wasteful procedure for one hundred percent leak testing.

Another major feature of the present invention is the use of an automated, stationary sniffer probe. As a result, the present method does not require the use of an operator to maneuver the "sniffer probe" and thereby reduces the labor costs associated with leak testing.

Still another feature of the present invention is the laminar flow and direction of the air within the enclosed shell. By eliminating air turbulence and regulating the direction and speed of the air flow, any tracer gas emitted from a leaking container will remain in the vicinity of that container as it traverses the interior of the shell. This feature permits precise identification of the particular leaking container.

Yet another feature of the present invention is the reduced pressure conditions within the interior of the enclosed shell notwithstanding the movement of the conveyor belt through it, made possible, in part, by the rotating gates. The maintenance of a reduced pressure atmosphere allows the tracer gas within the containers to escape, despite its contents or sealing temperature. This feature simplifies the detection of tracer gas and therefore increases the accuracy of the corresponding method.

Another feature of the present invention is the coordination of the automatic removal of leaking containers with respect to the detection of leakage. When the multicolumn gas chromatograph reads an unacceptable level of tracer gas, the signal is sent to the removal means which automatically removes the leaking package from the normal processing path. This feature further simplifies the procedure by which containers are checked for leaks.

Other features and advantages of the present invention will be apparent to those skilled in the art from a careful reading of the Detailed Description of a Preferred Embodiment presented below and accompanied by the drawings.

BRIEF DESCRIPTION OF THE DRAWINGS

FIG. 1 is a side, cross sectional view of the present invention according to a preferred embodiment.

FIG. 2 is a side, cross sectional view showing the entrance of the present invention according to a preferred embodiment.

FIG. 3 is a side, cross sectional view showing the exit of the present invention according to a preferred embodiment.

DETAILED DESCRIPTION OF A PREFERRED EMBODIMENT

In the following description, similar components are referred to by the same reference numeral in order to simplify the understanding of the sequential aspect of the drawings.

According to a preferred embodiment of the present invention, FIG. 1 shows a side, cross sectional view of the apparatus. The apparatus, generally designated by reference numeral 10, is comprised of enclosed shell 12, entry gate 15, exit gate 18, conveyor belt 26, valving means 30, blower 22, sniffer probe 36, gas chromatograph 38, removal means 40, and removal conveyor belt 42.

In operation, apparatus 10 is used in conjunction with an odorless, colorless, tasteless, non-toxic tracer gas which is injected into containers 24 prior to introduction to apparatus 10. The tracer gas must be of relatively high molecular weight and have low solubility in common packaging materials thereby resulting in low diffusion rates through such materials. SF6 is the preferred tracer gas, although other gases such as Carbon Tetrafluoride ($CF_4$) may be used.

Enclosed shell 12 is preferably of circular cross section so as to resist crushing by outside atmospheric pressure and has a length at least five times and preferably ten times its diameter. Entry gate 15 and exit gate 18, preferably of the type shown and described in patent application Ser. No. 08/100,161 filed Aug. 2, 1993 entitled "Conveyor With Rotary Airlock Apparatus" are located at region 14 and region 16, and define the entrance and exit of enclosed shell 12, respectively. The use of gates 15 and 18 allow a partial vacuum to exist in the interior 20 of enclosed shell 12. The partial vacuum in interior 20 is maintained by blower 22 located near exit gate 18. The vacuum existing in interior 20 may range from a few inches of water ($1'H_2O = 1.87$ mm Hg) to nearly a full atmosphere (760 mm Hg) below ambient pressure, depending on the type of containers 24 to be tested, their contents and the temperature at which they were sealed. Vanes 13 of entry gate 15 and vanes 17 of exit gate 18 cooperate with conveyor belt 26 such that containers 24 can be conveyed continually from region 14 to interior 20 of enclosed shell 12 and subsequently from interior 20 to region 16. The cooperation between vanes 13 and 17 of entry gate 15 and exit gate 18 and conveyor belt 26 maintains the partial vacuum in interior 20 while permitting a continuous flow of containers 24 through apparatus 10.

Referring now to FIG. 2 and FIG. 3, containers 24 move continuously from region 14 through entry gate 15 to interior 20. While traversing interior 20, containers 24 are tested for leaks by stationary "sniffer probe" 36, and subsequently move through exit gate 18 into region 16. To minimize the number of seals, conveyor belt 26 preferably makes a closed loop through enclosed shell 12 with the returning portion of conveyor belt 26 carried back from region 16 to region 14 beneath the enclosed shell 12 at ambient pressure, rather than through it. Belt 26 is supported by rollers 28, or by other suitable means, such as rails.

Valving means 30 permit air to enter interior 20, near entry gate 15, causing an overall flow of air from valving means 30 to blower 22 parallel to the direction of motion of conveyor belt 26. Concurrent regulation of blower 22 and valving means 30 cause this air flow to be laminar rather than turbulent, and to have the same speed as conveyor belt 26. Any given volume of air in interior 20 therefore tends to remain in the vicinity of the same container, for instance container 24, as it traverses enclosed shell 12. Sensing means (not shown), located in interior 20 are preferably provided to aid in this regulation. Perforated baffles 32 surround entry gate 15 and exit gate 18 in interior 20, forming plenums which help to distribute the incoming and outgoing air, thereby minimizing turbulence.

As containers 24 approach exit gate 18, samples of the air close to each container 24, together with possible tracer gas exiting containers 24 through leaks, are withdrawn through a stationary sniffer probe 36 or a plurality of such probes, and into gas chromatograph 38. The output signals from gas chromatograph 38 drive removal means 40, such as an air eject or solenoid, which removes leaking containers 24 from belt 26 and onto removal conveyor belt 42.

Referring now to FIG. 3, distance 44, measured from probe 36 to the point of action of removal means 40, is the distance covered by a given container 24 while the corresponding air sample is being analyzed by chromatograph 38. As a result, any given container 24 is passing in front of removal means 40 at the instant when its analytical results are delivered. Alternatively, gas chromatograph 38 can be equipped with a time delay, thereby synchronizing the time between the issuance of a signal to removal means 40 and the distance 44 traversed by a particular container 24. A container 24 for which excessive levels of tracer gas have been detected, indicating a leak, is automatically ejected by removal means 40 onto removal conveyor belt 42 and taken away for further testing.

For greater reliability, the tracer gas detection cut off value, programmed into chromatograph 38, which actuates the removal means 40, can be set relatively low. This low cut off value will ensure that containers 24 within the vicinity of the leak detected by chromatograph 38 are removed from conveyor belt 26. Containers 24 removed from conveyor belt 26 may then be spaced more widely on another conveyor belt running through an identical apparatus and retested. Those containers not giving a high leakage reading can be returned to the normal distribution process.

It will be apparent to those skilled in the art of industrial processing and leak detection that many modifications and changes may be made to the foregoing description of preferred embodiments without departing from the spirit and scope of the invention as defined by the appended claims.

What is claimed is:

1. An apparatus for testing each container of a series of containers for leaks of a tracer gas from within said containers, said apparatus comprising:
    a shell, said shell having an interior, an entrance, an exit opposing said entrance, said exterior having a first atmosphere, said interior having a second atmosphere, said conveying means conveying said series of containers through said shell from said entrance to said exit;
    means for conveying said series of containers;
    means for taking a sample of said second atmosphere in association with said each container;
    means for detecting said tracer gas in said second atmosphere when said tracer gas is leaking from one container of said series of containers, said detecting means issuing a signal when a leak of said tracer gas from said one container is detected;
    means for analyzing said sample of said second atmosphere, said sampling means in fluid communication with said taking means to detect said tracer gas in said sample; and
    means for removing said one container, said removal means responsive to said detecting means and removing said one container from said series of containers.

2. The apparatus as recited in claim 1, wherein said conveying means moves at a preselected speed so that said one container is in position with respect to said removing means to be removed when said signal from said detecting means arrives at said removing means.

3. The apparatus as recited in claim 1, wherein said removing means and said detecting means are spaced apart at a preselected distance so that when said conveying means conveys said one container said preselected distance to said removing means, said signal has been received by said removing means and said one container can be removed.

4. The apparatus as recited in claim 1, wherein said apparatus further comprises:
    means in fluid communication with said interior of said shell for controlling said second atmosphere;
    an entry gate carried by said entrance; and
    an exit gate carried by said exit,
    said entry and said exit gate permitting said conveying means to convey said series containers while limiting mixing of said first and said second atmospheres.

5. The apparatus as recited by claim I wherein said detecting means further comprises:
    a probe for taking a sample of said second atmosphere in association with said each container; and
    a gas chromatograph in fluid communication with said probe so that said gas chromatograph receives said sample from said probe for detecting said tracer gas.

6. The apparatus as recited in claim 1, wherein said apparatus further comprises:
    means in fluid communication with said interior of said shell for controlling said second atmosphere;
    an entry gate carried by said entrance; and
    an exit gate carried by said exit,
    said entry and said exit gate permitting said conveying means to convey said series containers while limiting mixing of said first and said second atmospheres, and wherein said removing means is outside said shell.

7. An apparatus for testing for leaks of a tracer gas coming from within each container of a series of said containers, said series of containers moving continuously on a belt, said each container having a first internal pressure, said apparatus comprising:

a shell having an interior, an exterior, an entrance and an exit opposing said entrance, said belt passing through said interior of said shell from said entrance to said exit, said exterior of said shell having a first atmosphere, said interior of said shell having a second atmosphere at a second pressure;

means for controlling said second atmosphere so that said second atmosphere flows parallel to and at the same speed as said belt and said second pressure is always less than said first pressure; and means in fluid communication with said interior of said shell for detecting said tracer gas in association with each container of said series of containers.

8. The apparatus as recited in claim 7, said apparatus further comprising an entry gate carried by said shell at said entrance, said entry gate permitting said containers and said belt to pass from said interior of said shell through said entrance but limiting mixing of said first and said second atmospheres.

9. The apparatus as recited in claim 7, further comprising an exit gate carried by said shell at said exit, said exit gate permitting said containers and said belt to pass from said interior of said shell through said exit but minimizing mixing of said first and said second atmosphere.

10. The apparatus as recited in claim 7, wherein said detecting means emits a signal when said detecting means detects a leak in association with a container of said series of containers, said apparatus further comprising means responsive to said signal from said detecting means for removing said one container from said belt when said detecting means detects said tracer gas.

11. The apparatus as recited in claim 7, wherein said controlling means further comprises:

a valve positioned to be in fluid communication near said entrance of said shell; and an exit blower positioned to be in fluid communication near said exit of said shell.

12. The apparatus as recited in claim 7, wherein said detecting means further comprises:

a probe in fluid communication with said interior of said shell; and a gas chromatograph in fluid communication with said probe, said probe drawing a sample of said second atmosphere in association with said one container of said series containers, and said gas chromatograph receiving and analyzing said sample.

13. An apparatus for testing each container of a series of containers for leaks of a tracer gas from within said containers, said containers having a first pressure, said apparatus comprising:

means for conveying said series of containers;

a shell having an interior, an entrance and an exit opposing said entrance, said conveying means moving through said interior of shell from said entrance to said exit, said shell defining a first region exterior to said shell having a first atmosphere and a second region interior to said shell, said second region having a second atmosphere and a second pressure;

an entry gate carried by said shell at said entrance, said entry gate permitting said containers and said belt to pass into said interior of said shell through said entrance, but reducing mixing of said first and said second atmospheres;

an exit gate carried by said shell at said exit, said exit gate permitting said containers and said belt to pass from said interior of said shell through said exit, but reducing mixing of said first and said second atmospheres;

means in fluid communication with said interior for detecting said tracer gas in association with each container of said series of containers, said detecting means issuing a signal when said tracer gas is detected in association with one container of said series of containers; and means responsive to said detecting means for removing said one container from said series of containers.

14. The apparatus as recited in claim 13, wherein said apparatus further comprises means for controlling said second atmosphere so that said second atmosphere flows parallel to and has the same speed as said conveying means so that said second atmosphere travels with said series of containers.

15. The apparatus as recited in claim 13, wherein said apparatus further comprises means for controlling said second atmosphere, said controlling means maintaining said second pressure lower than said first pressure so that said tracer gas is biased to leak from said each container.

16. The apparatus as recited in claim 13, wherein said removing means is located outside said shell and spaced apart from said detecting means, and said removing means receives said signal from said detecting means when said one container is proximate to said removing means.

17. The apparatus as recited in claim 13, wherein said detecting means further comprises:

a probe in said interior of said shell and proximate to said conveying means and said series of containers, said probe taking a sample of said second atmosphere associated with said each container; and a gas chromatograph in fluid communication with said probe for receiving and analyzing said sample, said gas chromatograph determining whether said tracer gas is present in said sample.

18. The apparatus as recited in claim 13, wherein said removal means is positioned with respect to said conveying means and said detecting means so that said one container is proximate to said removing means when said signal is received by said removing means.

19. The apparatus as recited in claim 13, wherein said detecting means issues said signal when said conveying means has conveyed said one container to said removing means.

* * * * *